(12) United States Patent
Nakamura

(10) Patent No.: US 9,115,828 B2
(45) Date of Patent: Aug. 25, 2015

(54) TRANSVERSE PIPE FLANGE SEPARATOR

(71) Applicant: Rodney S. Nakamura, Honolulu, HI (US)

(72) Inventor: Rodney S. Nakamura, Honolulu, HI (US)

( * ) Notice: Subject to any disclaimer, the term of this patent is extended or adjusted under 35 U.S.C. 154(b) by 204 days.

(21) Appl. No.: 14/054,712

(22) Filed: Oct. 15, 2013

(65) Prior Publication Data

US 2014/0101906 A1   Apr. 17, 2014

Related U.S. Application Data

(60) Provisional application No. 61/714,153, filed on Oct. 15, 2012.

(51) Int. Cl.
*B23P 19/04* (2006.01)
*F16L 1/09* (2006.01)
*F16L 23/00* (2006.01)
*B25B 27/10* (2006.01)
*B25B 27/02* (2006.01)

(52) U.S. Cl.
CPC ............... *F16L 1/09* (2013.01); *F16L 23/003* (2013.01); *B25B 27/023* (2013.01); *B25B 27/10* (2013.01); *Y10T 29/5367* (2015.01)

(58) Field of Classification Search
CPC .. B25B 27/023; B25B 27/0035; B25B 27/10; B25B 27/12; B25B 27/16
USPC .......... 269/45, 71, 75, 246, 143, 249; 29/237; 137/247.13, 545, 798
See application file for complete search history.

(56) References Cited

U.S. PATENT DOCUMENTS

| 889,315 | A | * | 6/1908 | Kenyon | 29/256 |
|---|---|---|---|---|---|
| 2,353,623 | A | * | 7/1944 | Saul | 254/100 |
| 2,393,795 | A | * | 1/1946 | Miller | 254/100 |
| 3,426,752 | A | * | 2/1969 | Laico | 606/53 |
| 3,835,522 | A | * | 9/1974 | Ward | 29/239 |
| 8,266,774 | B1 | * | 9/2012 | Doty | 29/253 |
| 2004/0123438 | A1 | * | 7/2004 | Kang | 29/239 |

* cited by examiner

*Primary Examiner* — Lee D Wilson
*Assistant Examiner* — Seahee Yoon
(74) *Attorney, Agent, or Firm* — Keri Ann K. S. Krzykowski; Martin E. Hsia

(57) ABSTRACT

A device for separating pipe flanges through the application of a transverse force. The device contains a frame, a frame retaining plate, a pusher pin, a leveling pin, an anchoring pin, a member, and anti-slip screws.

9 Claims, 22 Drawing Sheets

TRANSVERSE PIPE FLANGE SEPARATOR

This application claims the priority of U.S. provisional patent application No. 61/714,153 filed Oct. 15, 2012.

TECHNICAL FIELD

The present invention generally relates to devices for separating pipe flanges. More specifically, the invention relates to a device for separating pipe flanges through the application of a transverse force.

BACKGROUND ART

Pipe and valve systems are prevalent and can be found in various systems, such as hot water heaters, air conditioning systems, pipeline systems, large municipal water supply systems, and small high pressure steam lines to name a few examples. Occasionally, the pipes in these and other systems have to be disconnected to gain access to areas inside the pipes, to install new or additional pipes (or equipment such as valves, meters, regulators and filters), and/or to replace or repair existing pipes (or other equipment).

The pipes are often disconnected from each other at flange joints. A pipe flange is a disc, collar, or ring that is attached to the end of a pipe, often through welding or screwing, for the purpose of providing increased support for strength or for joining. A flange joint is a connection or joining of pipes that have flanges (pipe flanges), usually by bolting the flanges together.

Two pipes having flanges are joined at a flange joint by placing their pipe flanges against each other and aligning openings (attachment holes) located in the flanges, passing bolts through the attachment holes, and tightening the bolts. Often, the bolts are tightened with such force as to cause the flanges to stick together (bond) even after the bolts are removed. This bonding or adhering is often exacerbated by the use of gaskets or sealants (made of paper, asbestos, formed soft metal, caulk, rubber or various other materials) introduced between flanges for the purpose of providing a tighter seal. Further, the flanges, gaskets, or sealants corrode over time and increase the bonding force between flanges, even after the bolts are removed. All of these bonding forces make separation of pipe flanges very difficult.

To overcome these forces, hydraulic separators or wedges (such as chisels, screw drivers, or pry bars) have been used in the past to pry or force pipe flanges apart. These devices are used to separate pipe flanges by breaking the bond between them through lateral separation. However, sometimes pipe flanges cannot be separated using such lateral separation, because for example, the connected pipes may be wedged in between two walls so that there is no space to pry them apart. Other conditions which inhibit lateral separation of pipe flanges include connected pipes in valve pits, long pipelines, or tight complex pipe systems. Further, the use of hydraulic separators and wedges in such conditions can often damage the pipes or flanges.

Pipes also can carry flammable gases and liquids (such as fuel). Thus, sometimes for safety reasons, it is necessary and desirable to separate such pipes without resorting to hammering or pounding on the flanges to break the bond between them, in order to avoid creating sparks.

In the past, pipe flange alignment tools, such as ENERPAC ATM-Series flange alignment tools, have been used to apply small transverse forces to align pipe flanges to join the pipes. However, these alignment tools are very expensive and the prior art does not teach, disclose, or suggest using them for the purpose of separating pipe flanges, even though they apply transverse forces to pipe flanges. Further, these alignment tools do not provide a means to prevent longitudal slippage of the device when it is used on a sloping or irregular surface, because longitudinal slippage is not a problem when applying the small transverse forces necessary to align pipe flanges for joining.

Accordingly, it is an object of the present invention to provide an inexpensive, compact, portable device that can separate pipe flanges that are wedged together in tight spaces without causing damage to the pipes.

It is another object of the present invention to provide a device that can separate pipe flanges without the need for any hammering or pounding on the flanges.

It is further object of the present invention to provide a device that can apply a finely tunable transverse force to a specific area of a pipe flange so as to avoid damage to the flange and pipe.

It is still a further object of the present invention to provide a device that can prevent longitudal slippage of the device when used on sloping or irregular surfaces.

DISCLOSURE OF THE INVENTION

The above and other objects are preferably achieved by a device to separate a first pipe having a first pipe flange and a second pipe having a second pipe flange, wherein the first pipe flange and the second pipe flange are bonded at a flange joint comprising: an elongated frame having a front end and a back end; a frame retaining plate connected to the front end, whereby the frame retaining plate is placed adjacent to the first pipe flange so that the frame extends over the flange joint, and whereby the frame retaining plate prevents longitudal slippage of the device; a pusher pin having a pusher pin top end and a pusher pin bottom end, located a first distance along the frame from the frame retaining plate, wherein the pusher pin is capable of moving transversely between a first retracted position and a first extended position; a leveling pin having a leveling pin top end and a leveling pin bottom end, located at the back end of the frame, wherein the leveling pin is capable of moving transversely between a second retracted position and a second extended position, and whereby when the leveling pin is pushed to the second extended position, the device is stabilized against the second pipe; an anchoring pin having an anchoring pin top end and an anchoring pin bottom end, located between said pusher pin and said leveling pin along said frame, wherein the second distance is greater than the first distance, and wherein the anchoring pin bottom end contains a member which extends toward the flange joint and is configured to anchor the anchoring pin to the second pipe flange; and whereby when the anchoring pin is anchored to the second pipe flange, and the pusher pin is pushed to the first extended position to apply a transverse force on the first pipe flange, the first pipe flange and the second pipe flange slide in opposite directions from each other and are separated.

The frame of the device is preferably two substantially parallel bars with a space between them. The frame retaining plate preferably contains anti-slip screws to secure the frame retaining plate against the first pipe flange. The pusher pin bottom end and the leveling pin bottom end also preferably have enlarged bearing surfaces.

The above and other objects are also preferably achieved by a device to separate a first pipe having a first pipe flange and a second pipe having a second pipe flange, wherein the first pipe flange and the second pipe flange are bonded at a flange joint comprising: an elongated frame having a front end and a back end, wherein the frame comprises two substantially parallel bars with a space between them; a frame retaining plate connected to the front end, whereby the frame retaining plate is placed adjacent to the first pipe flange so that the frame extends over the flange joint, and whereby the frame retaining plate prevents longitudinal slippage of the device; a pusher pin having a pusher pin top end and a pusher pin bottom end, located a first distance along the frame from the pin retaining plate, which is receivable in a removable, slidable first sleeve having a top side and bottom side, wherein the pusher pin is transversely moveable between a first retracted position and a first extended position through the first sleeve, and wherein the first sleeve is locked into place along the frame by screwing pusher pin end plates onto the first sleeve top side and the first sleeve bottom side until the pusher pin end plates are tightened against the frame; a leveling pin having a leveling pin top end and a leveling pin bottom end, located at the back end of the frame, wherein the leveling pin is receivable in a removable, slidable second sleeve having a top side and bottom side and transversely movable between a second retracted position and a second extended position through the second sleeve, and wherein the second sleeve is locked into place along the frame by screwing leveling pin end plates onto the second sleeve top side and the second sleeve bottom side until the leveling pin end plates are tightened against the frame, and whereby when the leveling pin is pushed to the second extended position, the device is stabilized against the second pipe; an anchoring pin, located between said pusher pin and said leveling pin along said frame, wherein the anchoring pin contains an anchoring pin top end and an anchoring pin bottom end with a member extending from the anchoring pin bottom end toward the flange joint to anchor the anchoring pin to the second pipe flange; and whereby when the anchoring pin is anchored to the second pipe flange, and the pusher pin is pushed to the first extended position to apply a transverse force on the first pipe flange, the first pipe flange and the second pipe flange slide in opposite directions from each other and are separated.

In a preferred embodiment, the first sleeve bottom side and pusher pin end plate are integrally formed, and the second sleeve bottom side and leveling pin end plate are also integrally formed. The pusher pin bottom end and the leveling pin bottom end also preferably have enlarged bearing surfaces. Preferably, the frame retaining plate contains anti-slip screws to secure the frame retaining plate against the first pipe flange.

The above and other objects are also preferably achieved by a device to separate a first pipe having a first pipe flange and a second pipe having a second pipe flange, wherein said first pipe flange and said second pipe flange are bonded at a flange joint, comprising an elongated frame with a front end and a back end; a pusher pin having a pusher pin top end and a pusher pin bottom end, located a first distance along said frame from said front end, wherein said pusher pin is capable of moving transversely between a first retracted position and a first extended position; a leveling pin having a leveling pin top end and a leveling pin bottom end, located at said back end of said frame, wherein said leveling pin is capable of moving transversely between a second retracted position and a second extended position, and whereby when said leveling pin is pushed to said second extended position, said device is stabilized against said second pipe; an anchoring pin having an anchoring pin top end and an anchoring pin bottom end, located between said pusher pin and said leveling pin along said frame, wherein said anchoring pin bottom end contains a member which extends toward said flange joint and is configured to anchor said anchoring pin to said second pipe flange; and whereby when said anchoring pin is anchored to said second pipe flange, and said pusher pin is pushed to said first extended position to apply a transverse force on said first pipe flange, said first pipe flange and said second pipe flange slide in opposite directions from each other, the improvement comprising: a frame retaining plate connected to said front end, whereby said frame retaining plate is placed adjacent to said first pipe flange so that said frame extends over said flange joint to prevent longitudinal slippage of said device.

BEST MODE FOR CARRYING OUT THE INVENTION

The presently preferred best modes for carrying out the present invention are illustrated by way of example in FIGS. 1-22.

Referring to FIGS. 1-8, shown is a first presently preferred embodiment of the invention comprising of a frame 1000 connected to a frame retaining plate 1002. Preferably, the frame 1000 is a single bar or two substantially parallel bars with a space in between them. The frame is preferably connected to the frame retaining plate 1002 through the use of screws or welding (or other conventional means), or it can be integrally formed with the frame retaining plate (through molding or other similar means). Preferably, anti-slip screws 1004 on the frame retaining plate 1002 are configured to secure the plate against a first pipe flange 1006 (shown in FIG. 8).

Figure 1:
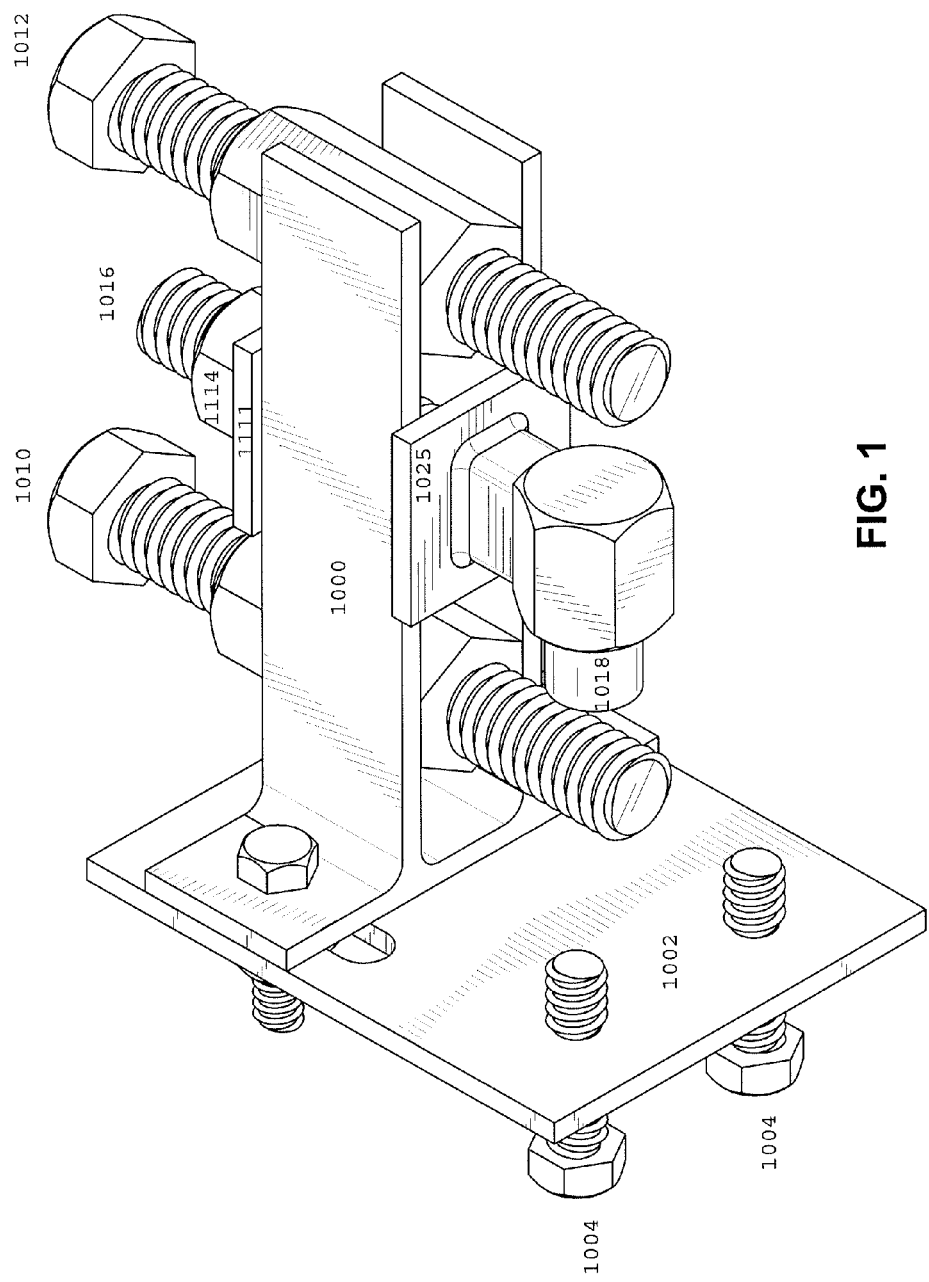
FIG. 1 is a perspective view from the bottom, rear, right of a first presently preferred embodiment of the invention.
Figure 2:
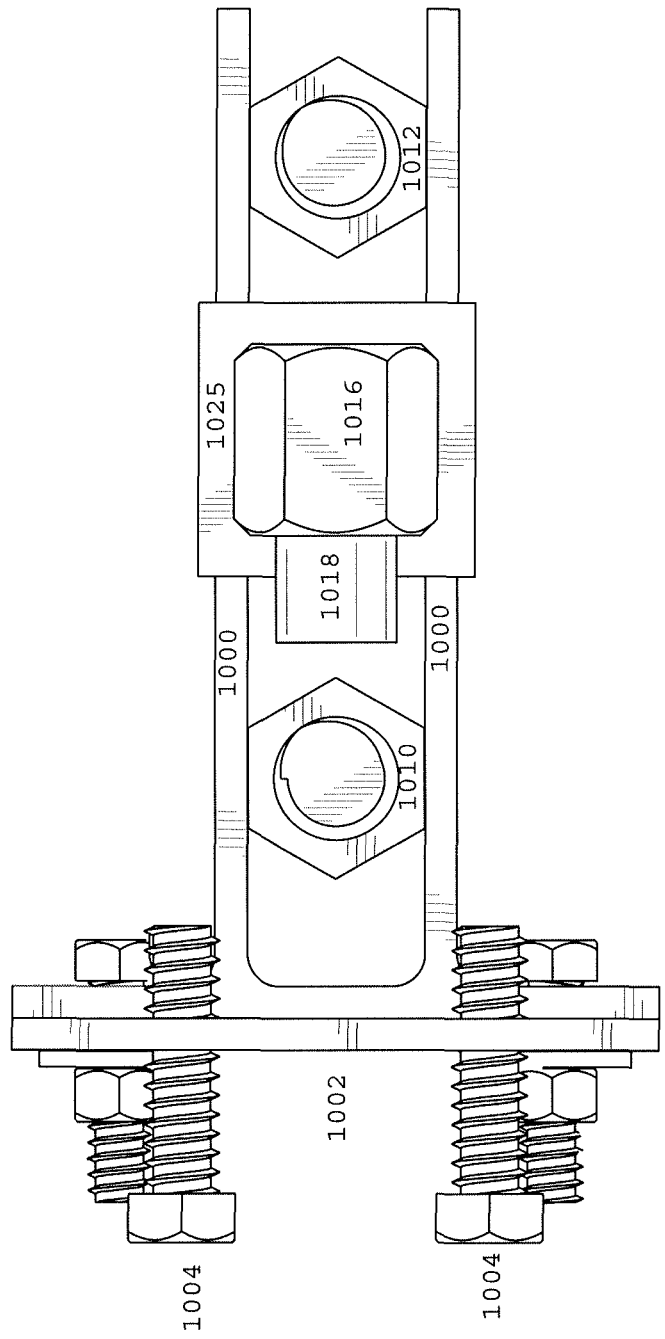
FIG. 2 is a bottom plan view thereof.
Figure 3:
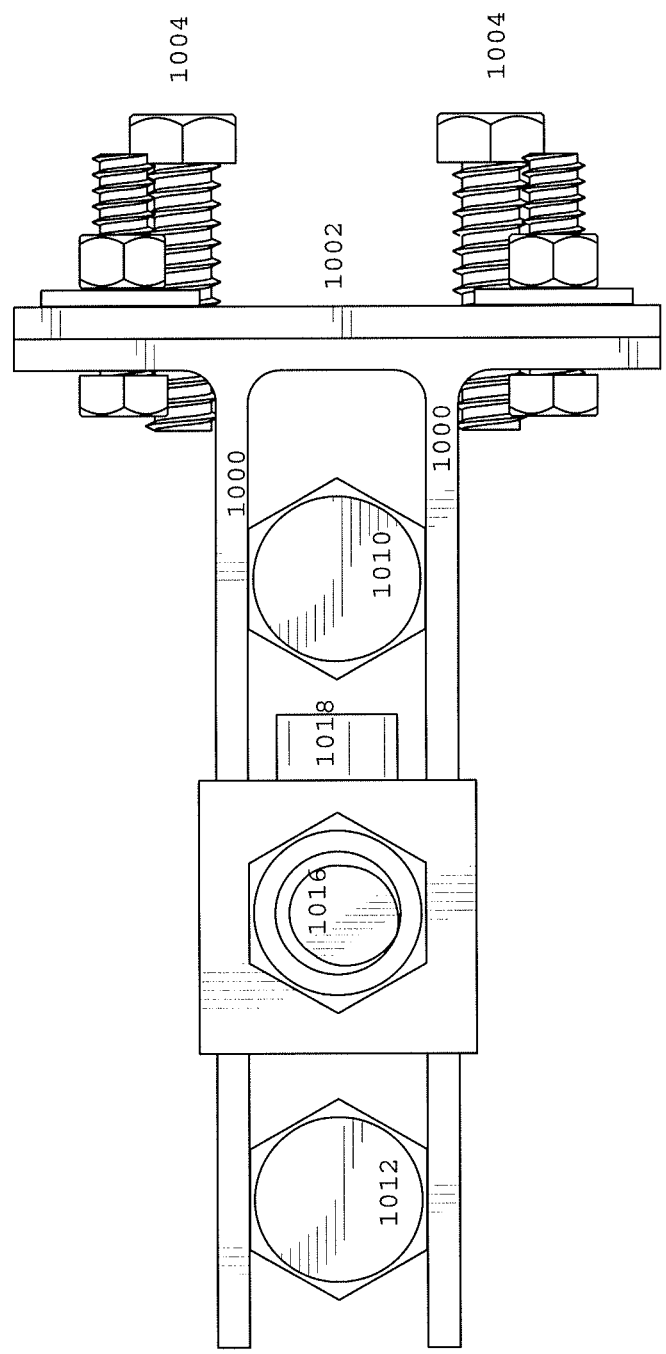
FIG. 3 is a top plan view thereof.
Figure 4:
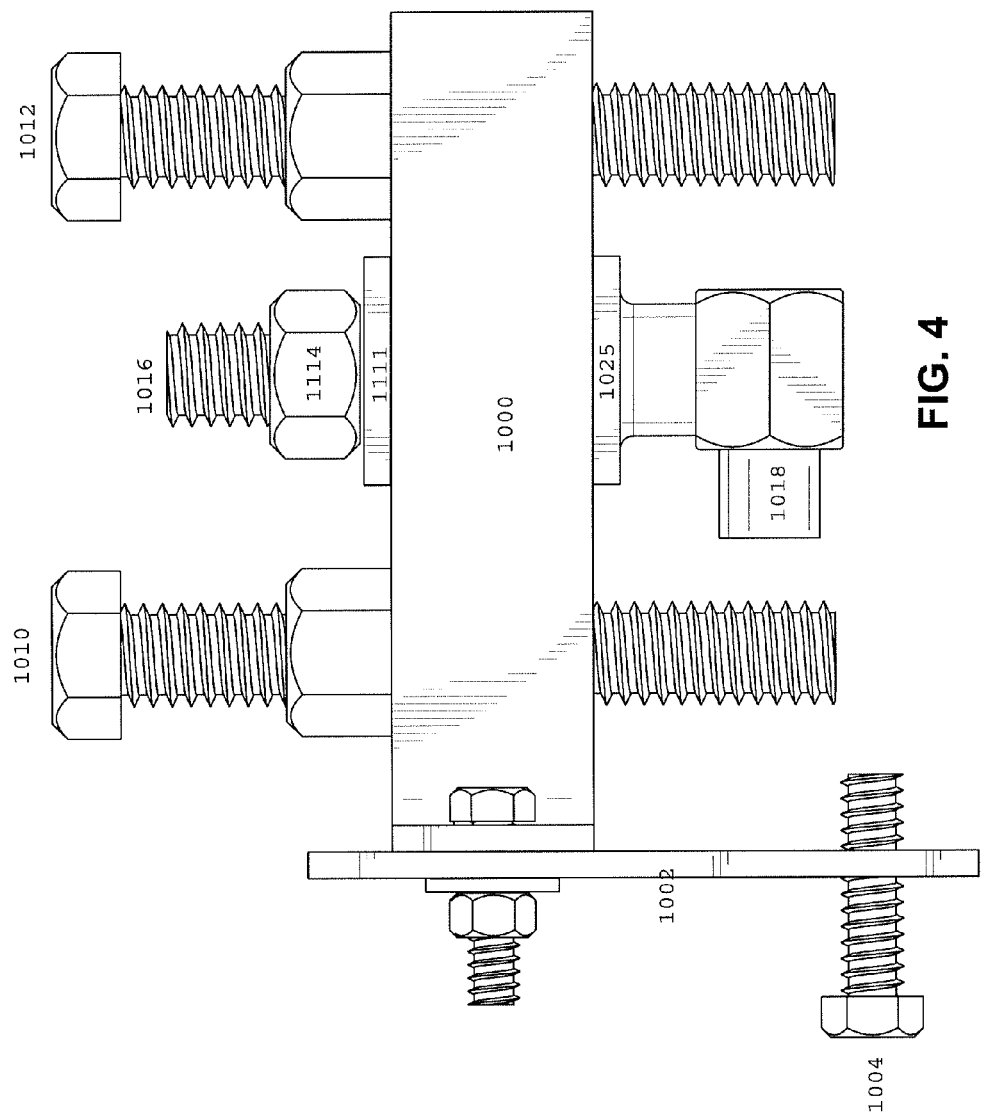
FIG. 4 is an elevational view thereof from the right.
Figure 5:
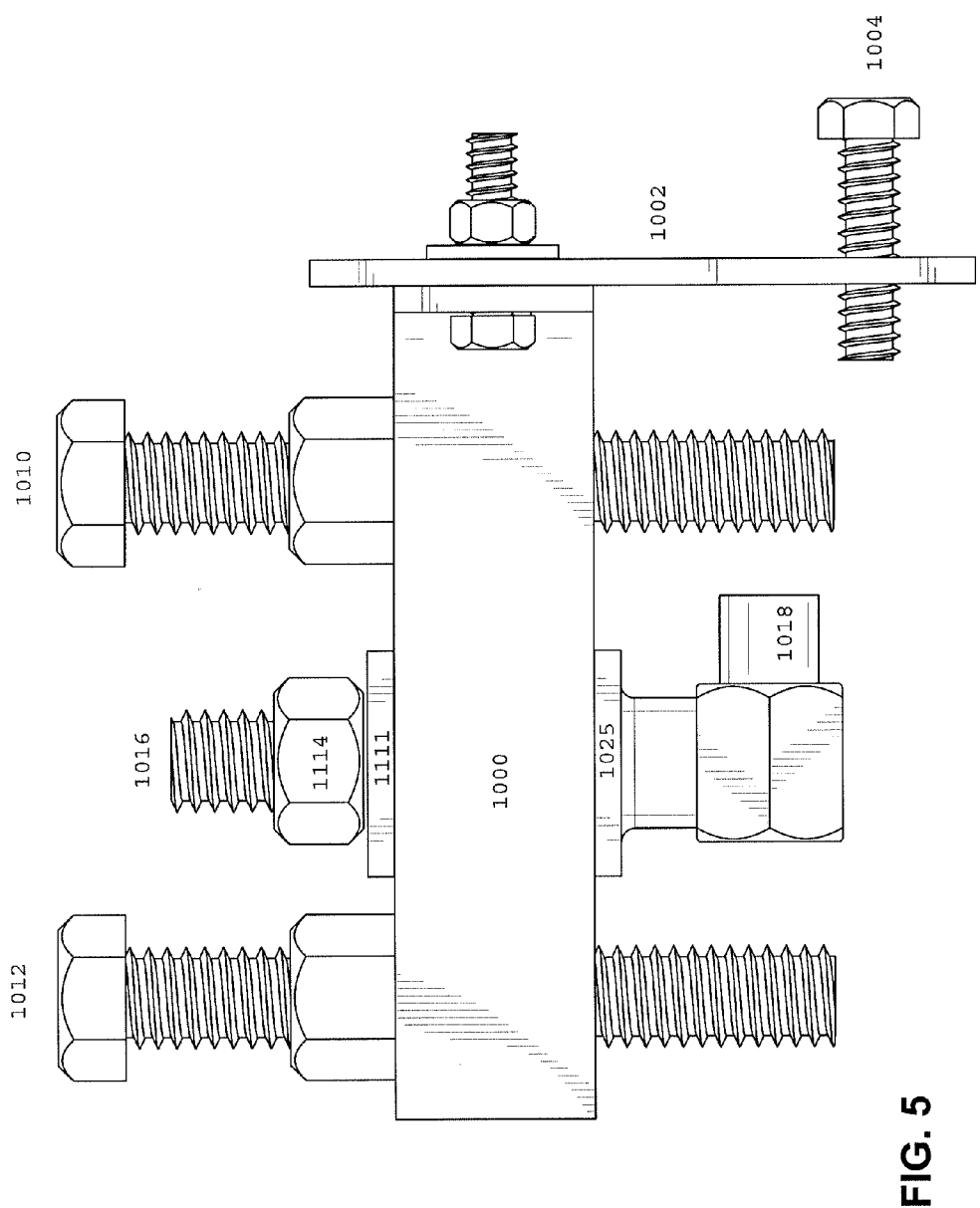
FIG. 5 is an elevational view thereof from the left.
Figure 6:
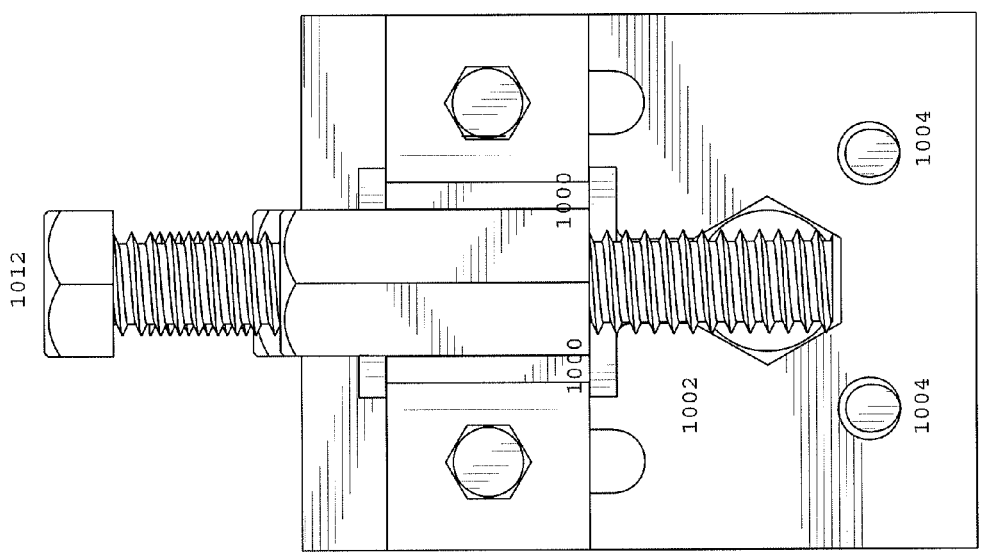
FIG. 6 is an elevational view thereof from the rear.
Figure 7:
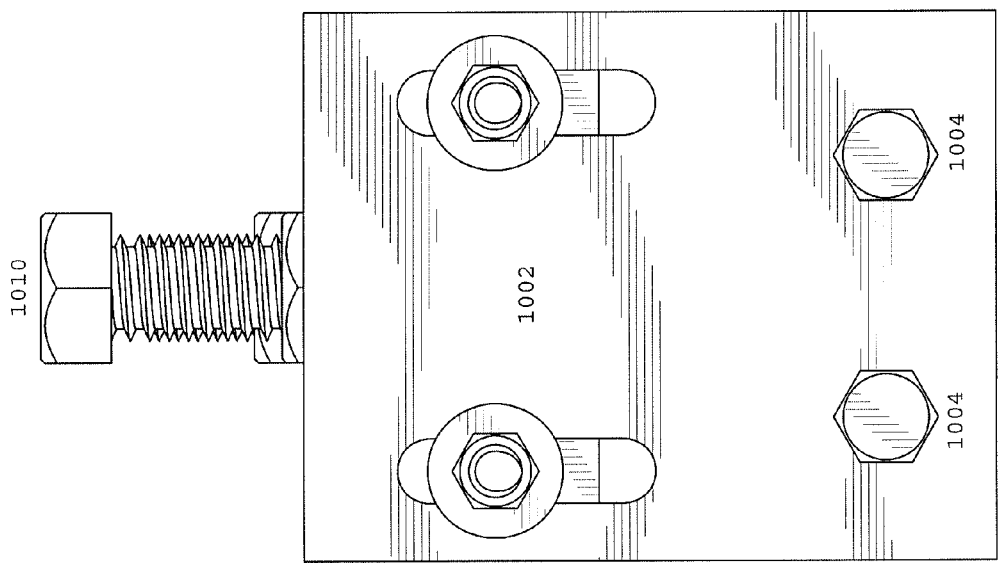
FIG. 7 is an elevational view thereof from the front.
Figure 8:
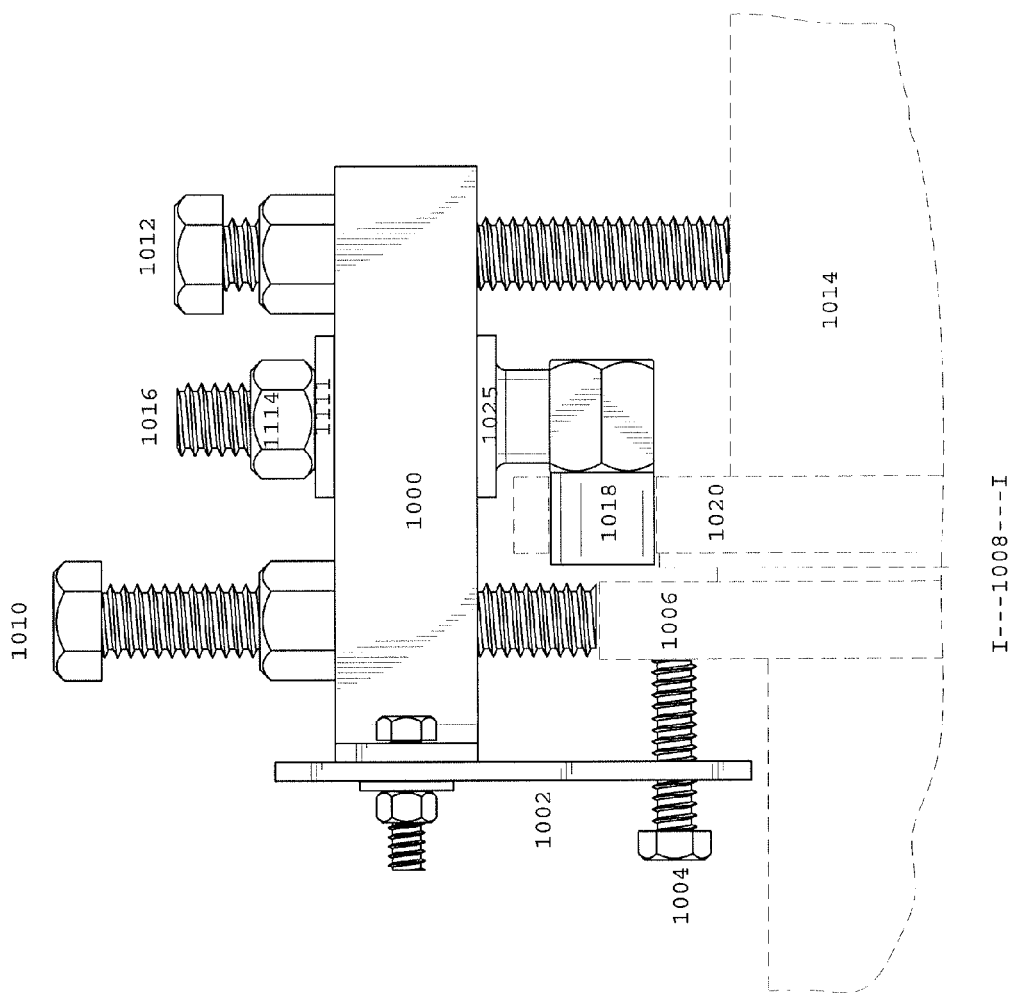
FIG. 8 is an elevational view from the right of the first presently preferred embodiment of the invention while it is in use.
Figure 9:
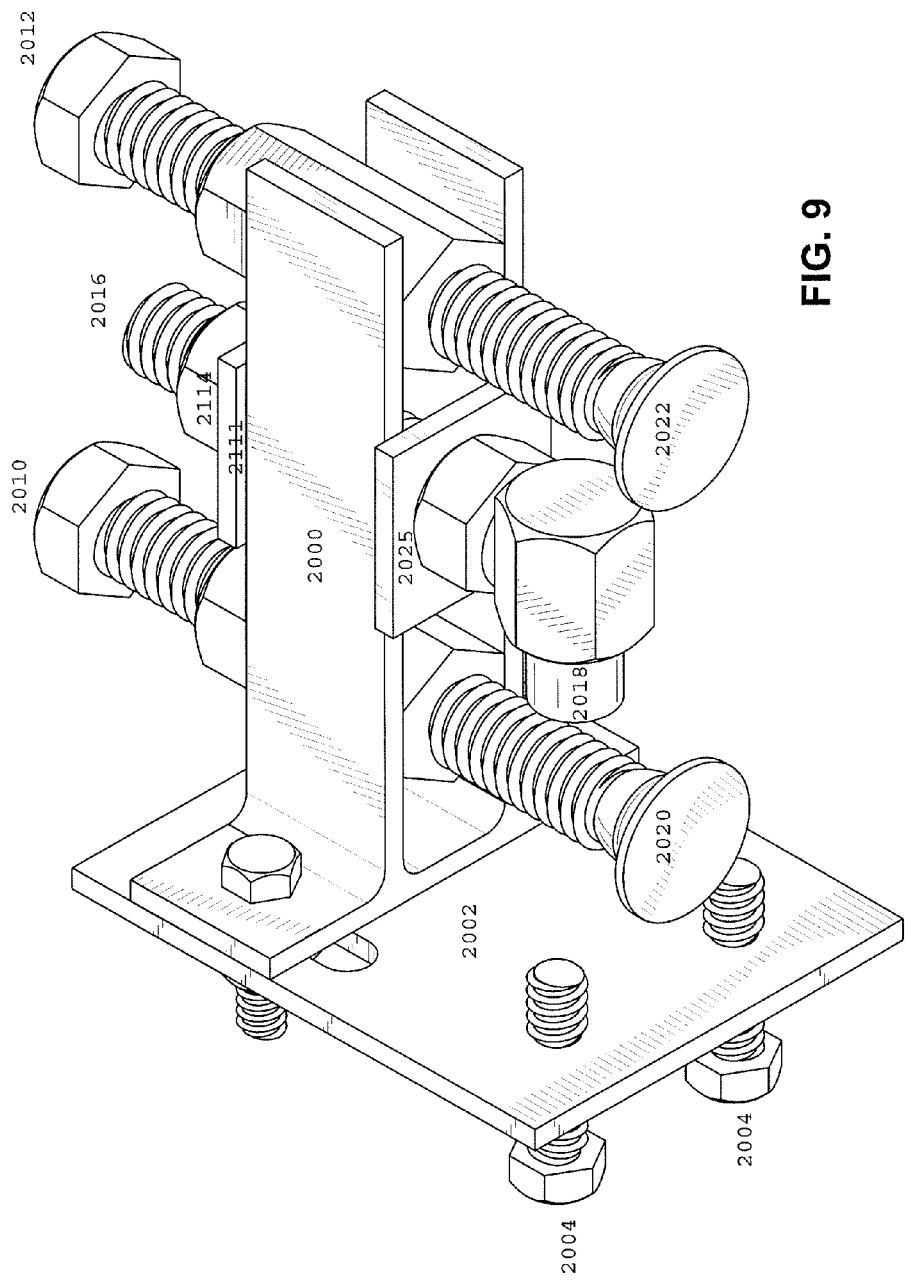
FIG. 9 is a perspective view from the bottom, rear, right of a second presently preferred embodiment of the invention.
Figure 10:
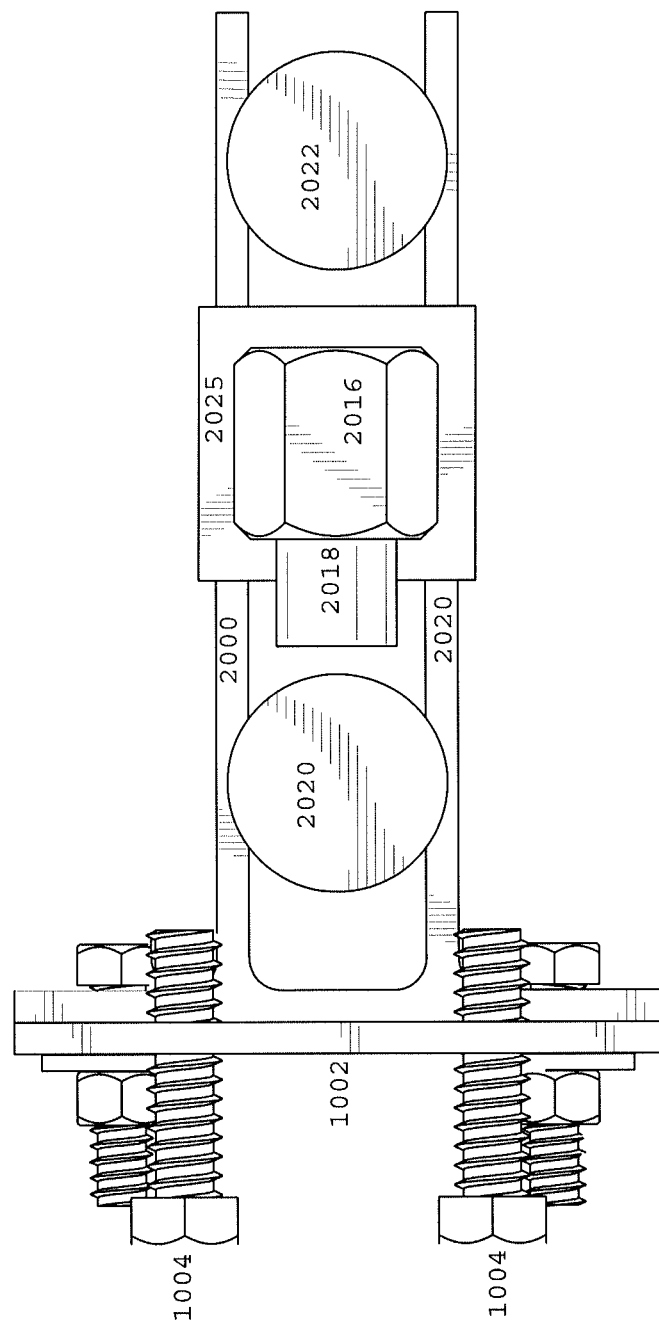
FIG. 10 is a bottom plan view thereof.
Figure 11:
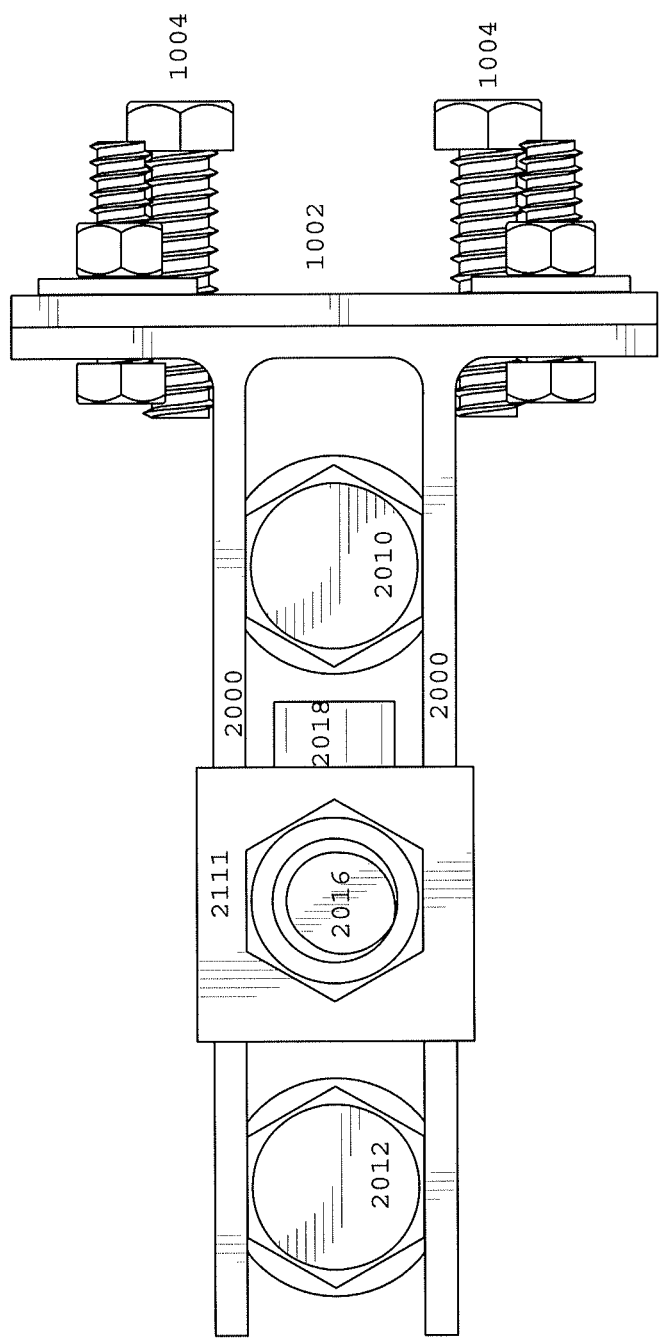
FIG. 11 is a top plan view thereof.
Figure 12:
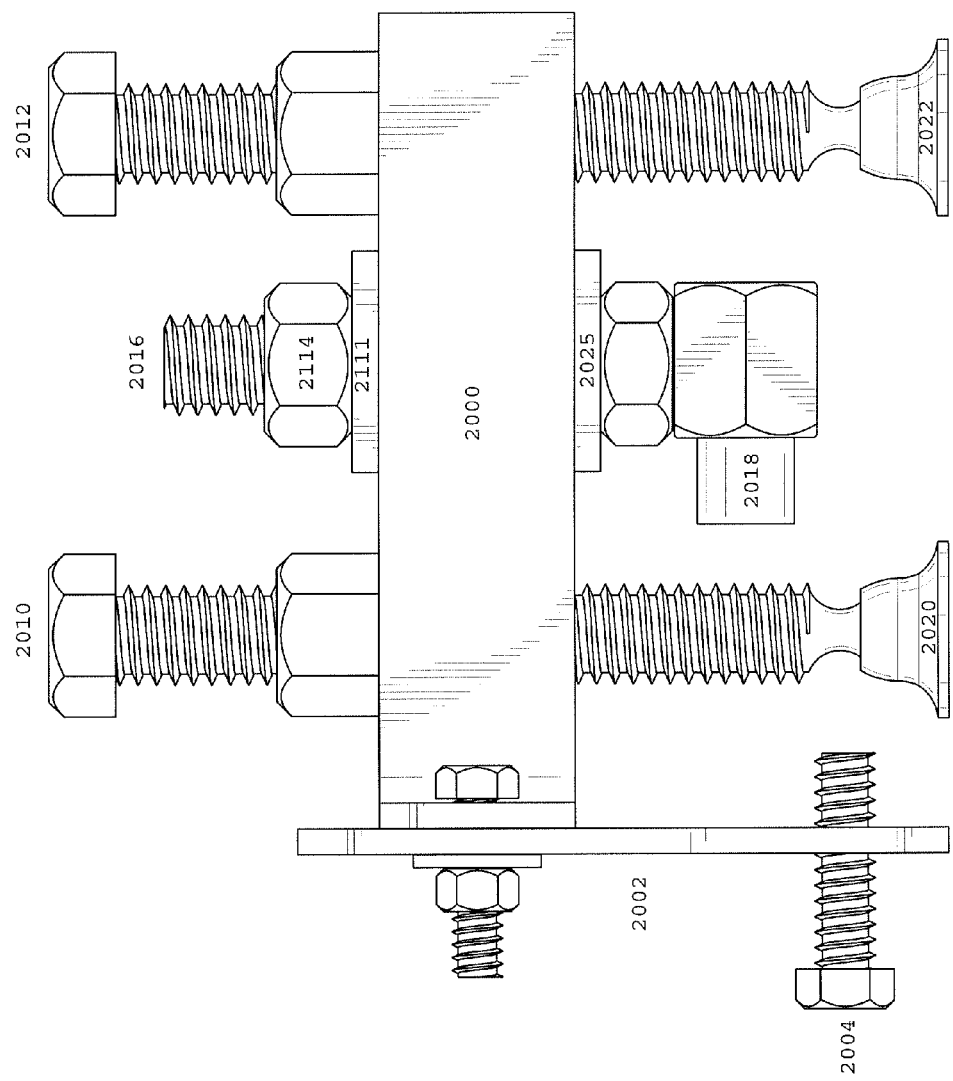
FIG. 12 is an elevational view thereof from the right.
Figure 13:
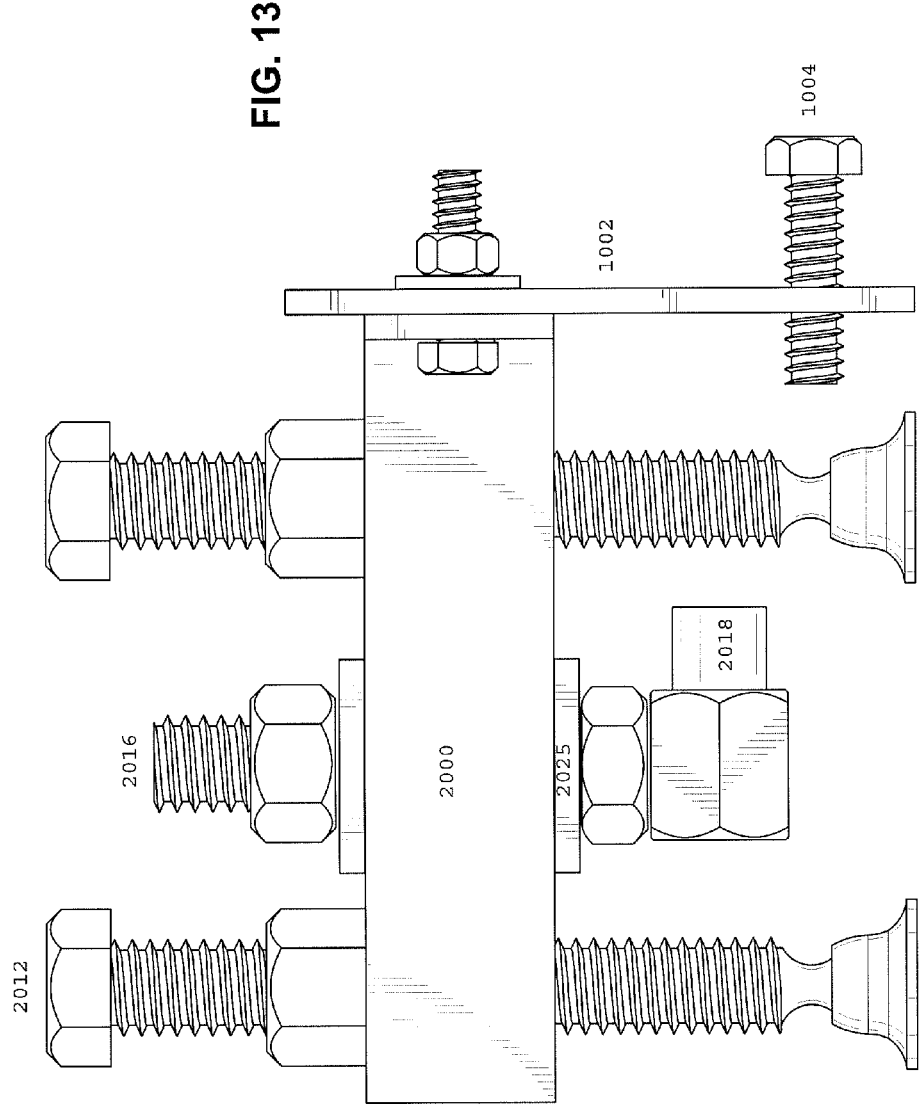
FIG. 13 is an elevational view thereof from the left.
Figure 14:
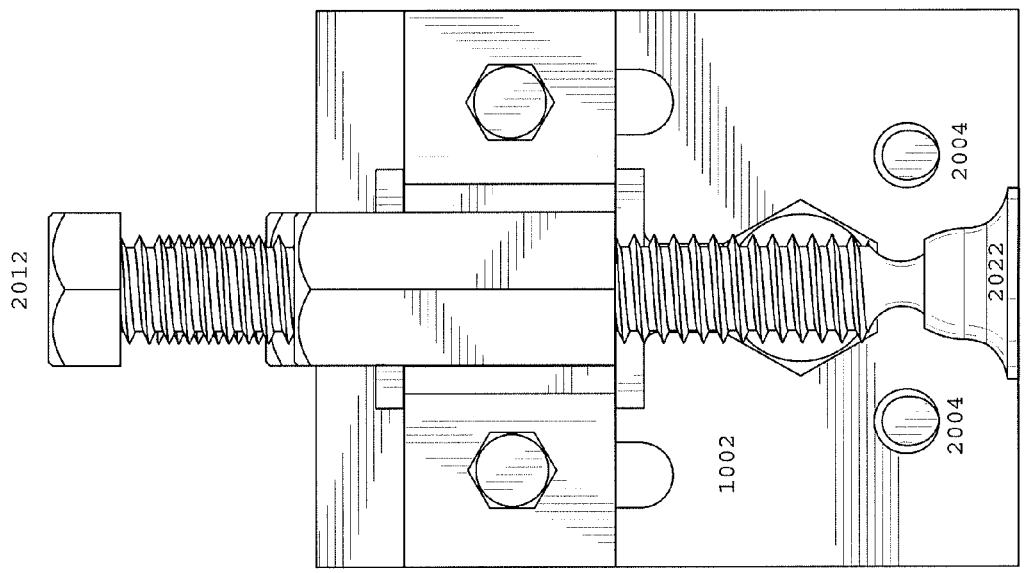
FIG. 14 is an elevational view thereof from the rear.
Figure 15:
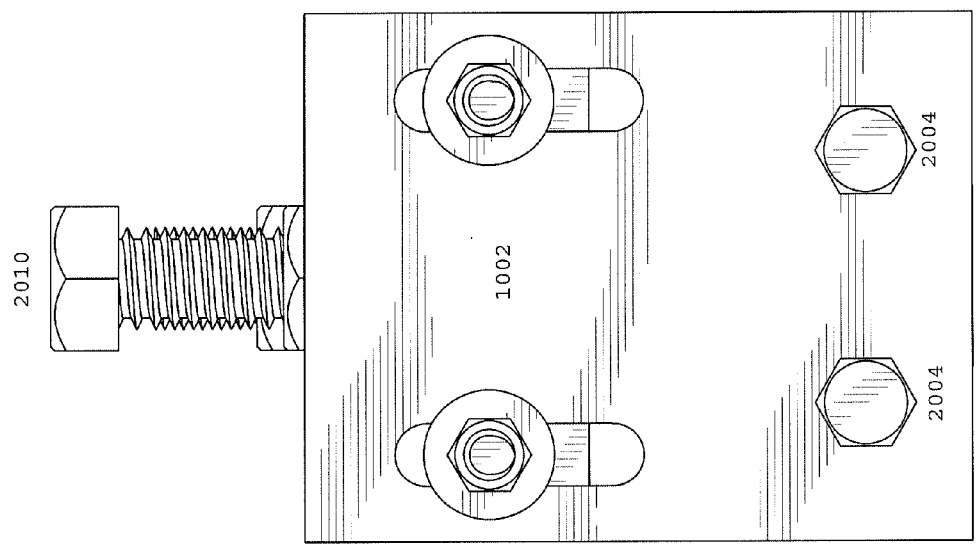
FIG. 15 is an elevational view thereof from the front.
Figure 16:
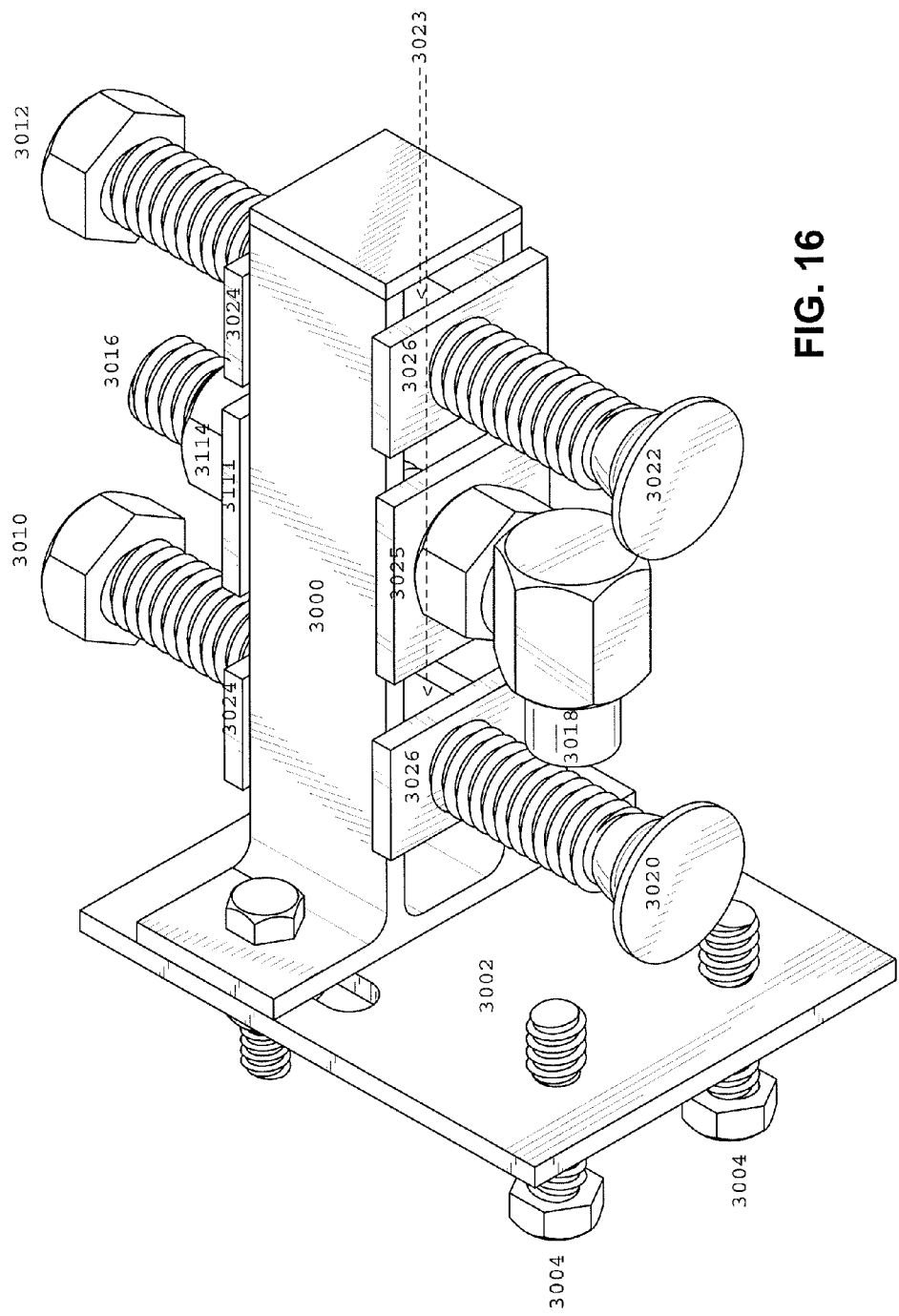
FIG. 16 is a perspective view from the bottom, rear, right of a third presently preferred embodiment of the invention.
Figure 17:
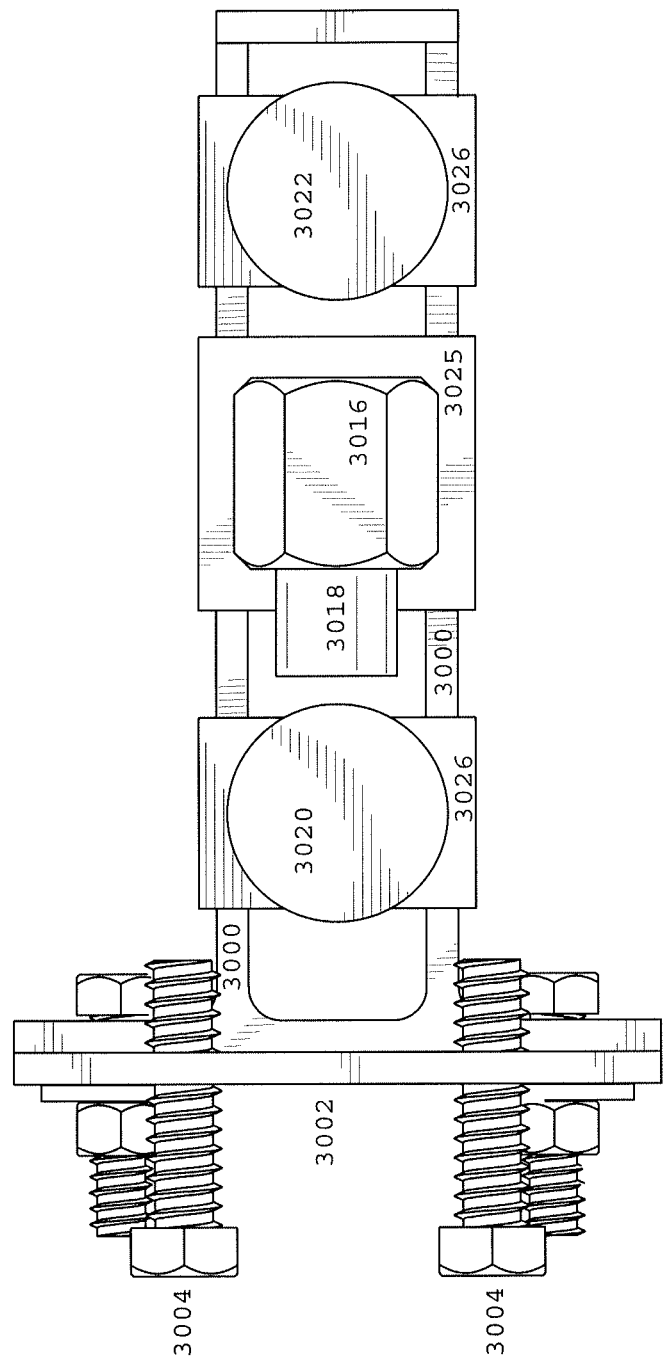
FIG. 17 is a bottom plan view thereof.
Figure 18:
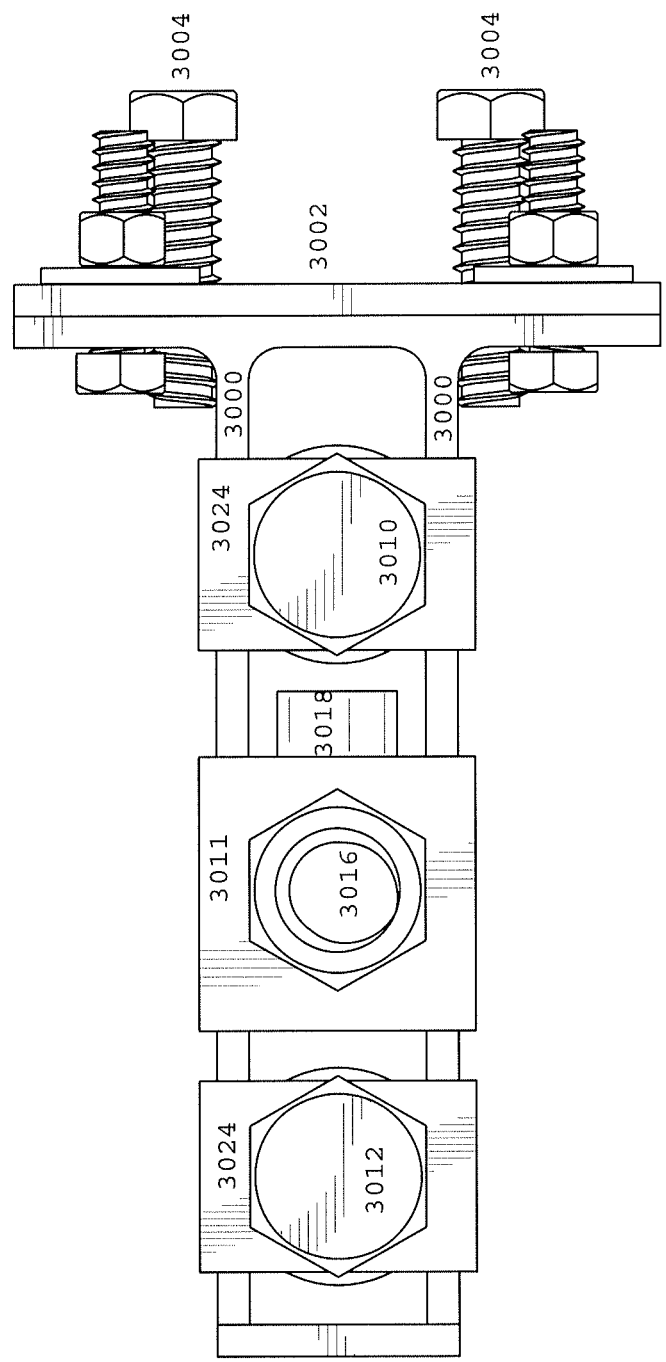
FIG. 18 is a top plan view thereof.
Figure 19:
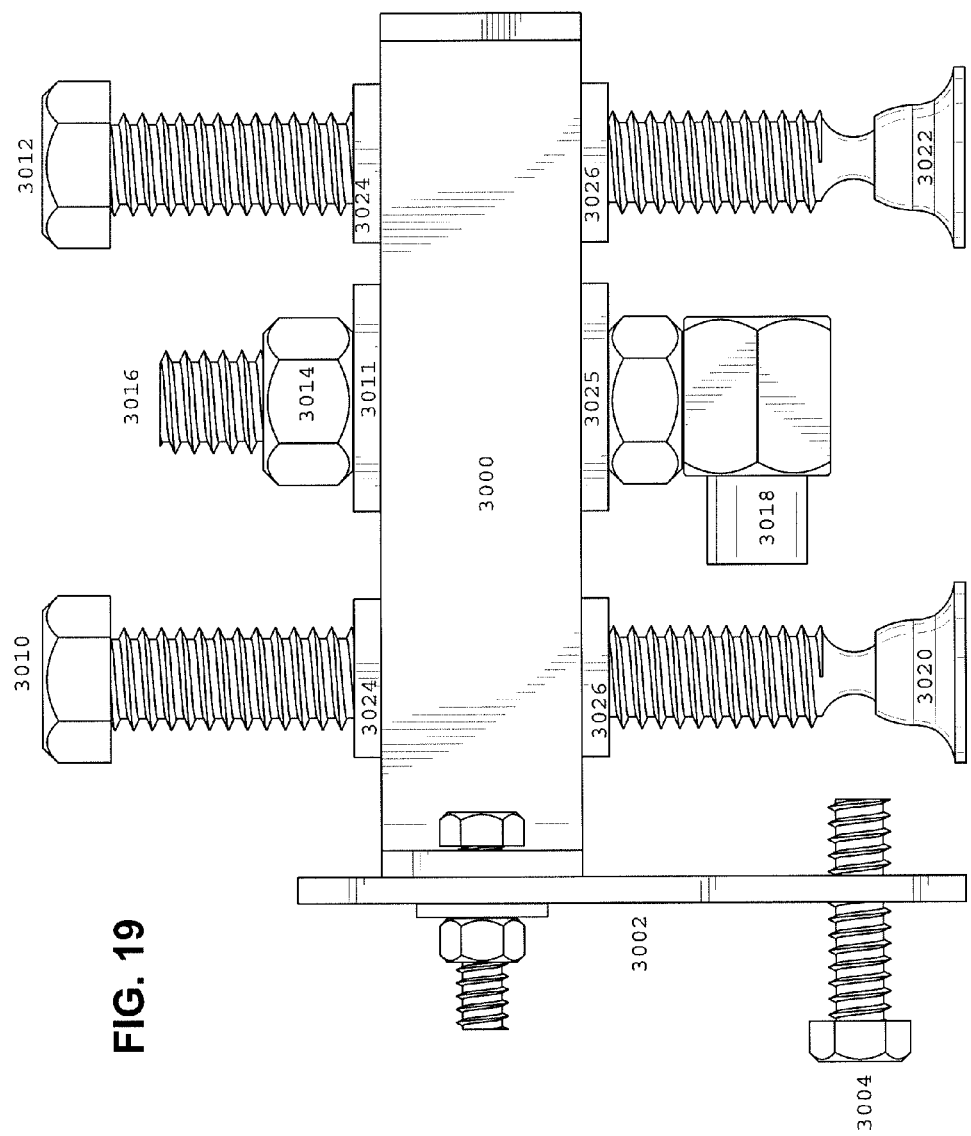
FIG. 19 is an elevational view thereof from the right.
Figure 20:
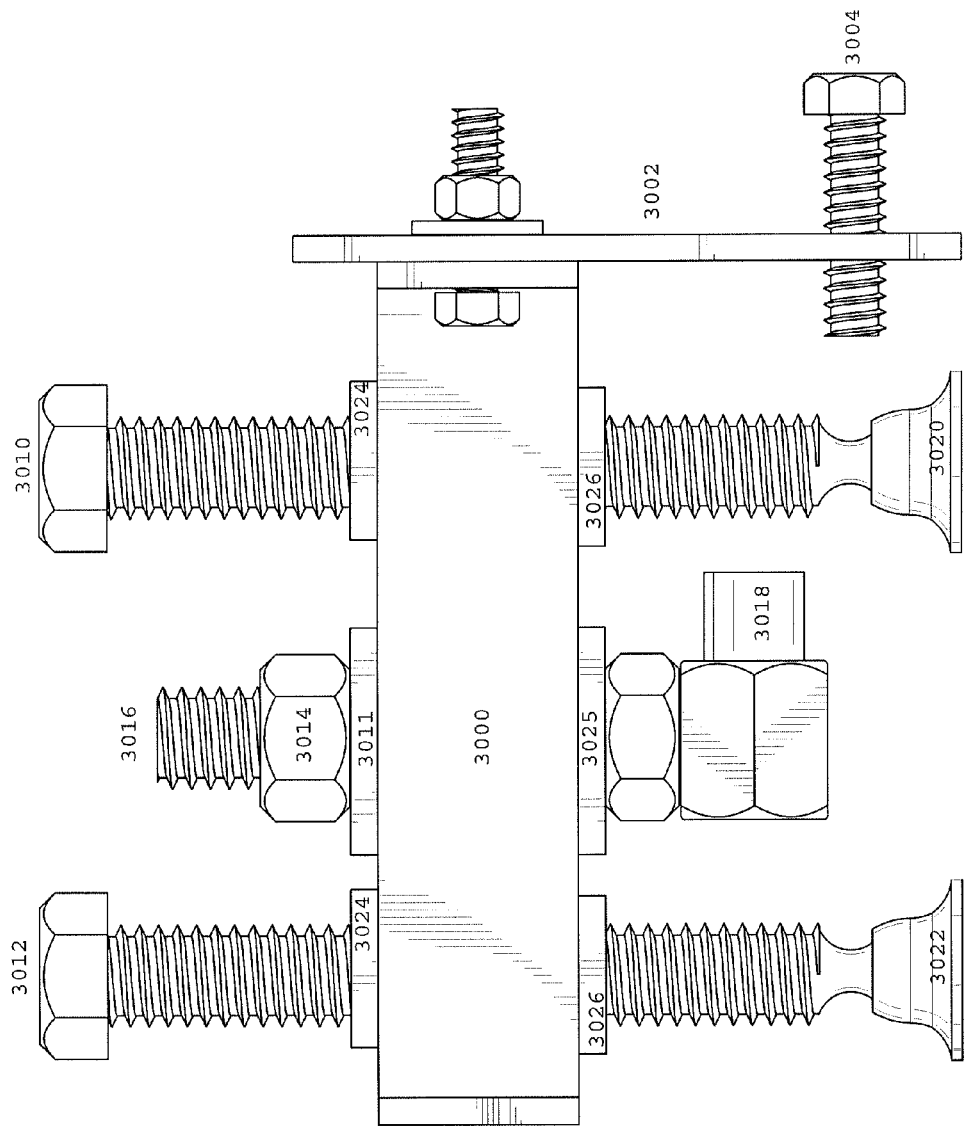
FIG. 20 is an elevational view thereof from the left.
Figure 21:
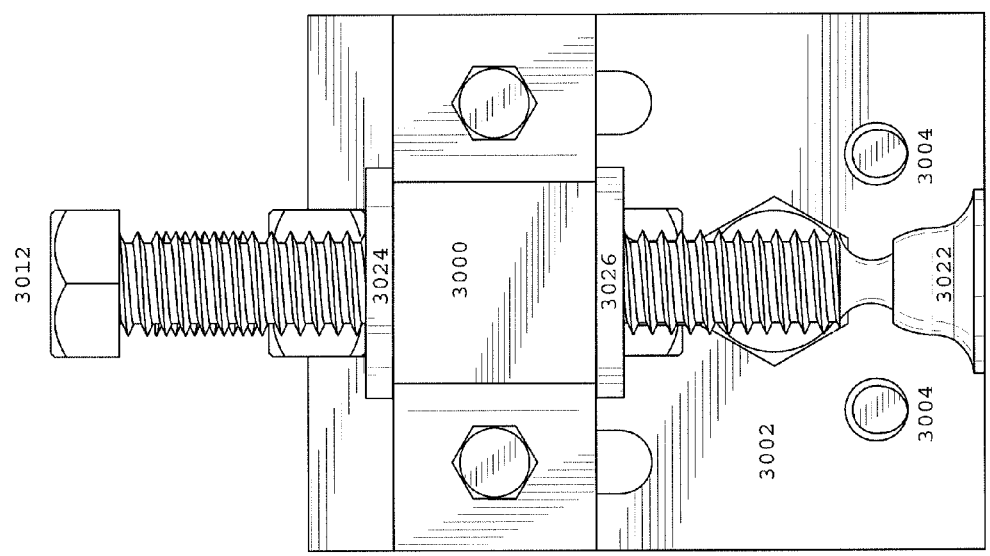
FIG. 21 is an elevational view thereof from the rear.
Figure 22:
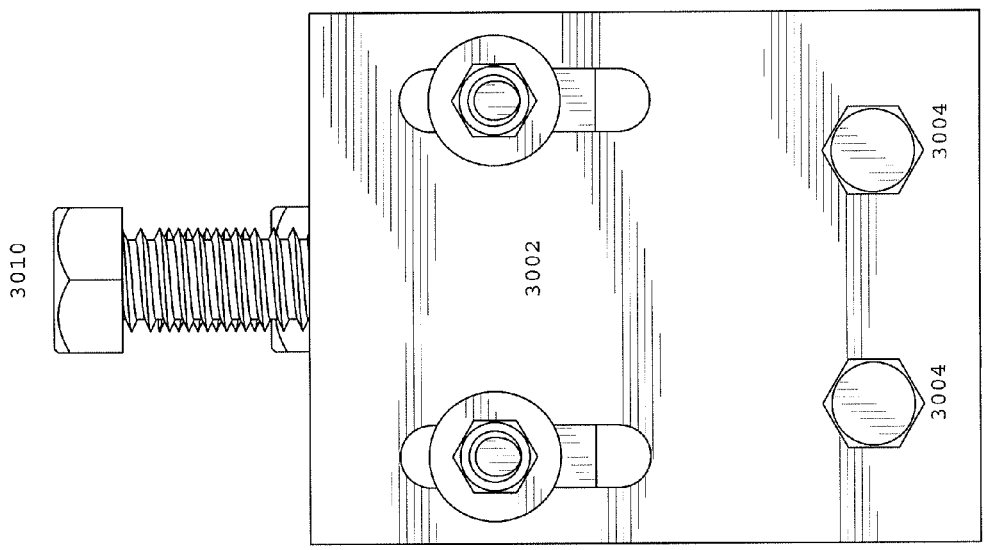
FIG. 22 is an elevational view thereof from the front.

As shown in FIG. 8, the frame retaining plate 1002 and anti-slip screws 1004 prevent longitudinal slippage of the device when it is placed over a first pipe flange 1006 so that the frame extends over the flange joint 1008 and is used. Further, if the two bonded piped are in a substantially vertical orientation so that their flanges are substantially horizontal, the frame retaining plate can be used to rest the device on the top flange thereby reducing the difficulty in holding up the device while using it to separate the flanges.

As shown in FIGS. 1-8, the presently preferred first embodiment of the invention includes a pusher pin 1010 located a first distance along the frame 1000. The pusher pin 1010 is configured to pass through the frame 1000 from a retracted position to an extended position. Preferably, the pusher pin 1010 is threaded and passes through a threaded aperture in the frame 1000; however, any means that allows the pusher pin 1010 to be pushed toward engagement with the first pipe flange 1006 (as shown in FIG. 8) can be used.

Preferably, a leveling pin 1012, located at the end of the frame 1000 farthest from the frame retaining plate 1002, is also configured to pass through the frame 1000 from a retracted position to an extended position. When in the extended position, the leveling pin helps to secure the device against a second pipe 1014 (as shown in FIG. 8). Like the pusher pin 1010, the leveling pin 1012 is preferably threaded and passes through a threaded aperture in the frame 1000; however, any means that allows the leveling pin 1012 to be pushed toward engagement with the second pipe 1014 (as shown in FIG. 8) can be used.

The presently preferred embodiment of the invention further includes an anchoring pin 1016 located between the pusher pin 1010 and the leveling pin 1012 along the frame 1000. It preferably contains a member 1018 that extends toward the flange joint and is inserted into an attachment hole in the second flange 1020 to secure the device, as shown in FIG. 8. The member is preferably removable and replaceable with members of different sizes. The pusher pin 1010 is extended and pushes against the first flange 1006, but the anchoring pin 1016 anchors the second flange 1020, so that the first flange 1006 and second flange 1020 slide (move) transversely in opposite directions from each other, thereby breaking the bond between the flanges.

The anchoring pin 1016 preferably has a bottom end plate 1025 to help secure it against the frame. The bottom end plate 1025 is preferably integrally formed with the anchoring pin 1016. The anchoring pin is removable and able to be locked into place along the frame 1000 through conventional means, such as by screwing (tightening) a washer 1111 and nut 1114 to engage the frame at the top end of the anchoring pin.

A washer is a thin plate which contains a hole in the middle. It is typically disk-shaped, but they can be other shapes such as square or rectangular. Washers are usually made of metal, but they can also be made of plastic. They are normally used to distribute the load of a threaded fastener, such as a screw or nut.

Referring to FIGS. 9-15, shown is a second presently preferred embodiment of the invention, comprising a frame 2000, frame retaining plate 2002, anti-slip screws 2004, a pusher pin 2010, a leveling pin 2012, an anchor pin 2016, a washer 2111, a nut 2114, a bottom end plate 2025, and a member 2018, all of which function in the same manner as in the first preferred embodiment. In this second embodiment, however, the bottom surface of the pusher pin 2020 and leveling pin 2022 are preferably broadened to form enlarged bearing surfaces. These enlarged bearing surfaces are configured to be small enough so that they do not interfere with the operation of the device. For example, the bearing surface of the pusher pin is configured to be wide enough to enlarge the surface area where the transverse force is applied on the first pipe flange (as shown in FIG. 8), but small enough to avoid engagement with the second pipe flange 1020, which would interfere with the operation of the device. The bearing surfaces are also preferably able to swivel, thereby enhancing their ability to maintain contact with a flange or pipe.

Referring to FIGS. 16-22, shown is a third presently preferred embodiment of the invention, comprising of a frame 3000, frame retaining plate 3002, anti-slip screws 3004, a pusher pin 3010, a leveling pin 3012, an anchor pin 3016, a washer 3111, a nut 3114, a bottom end plate for the anchoring pin 3025, and a member 3018, all of which function in the same manner as in the first and second preferred embodiments. The frame 3000 in third embodiment is preferably comprised of two substantially parallel bars with a space between. The third embodiment also has enlarged bearing surfaces at the bottom surface of the pusher pin 3020 and leveling pin 3022, as in the second preferred embodiment.

The third embodiment differs from the first and second embodiments in that the pusher pin 3010 and leveling pin 3012 are slidable so that their location along the frame 3000 can be adjusted to a user's preference. This is preferably accomplished through the use of a sleeve 3023 for the pusher pin 3010 and leveling pin 3012, wherein the sleeve is slightly longer than the width of the frame 3000 and has internal and external threading. The internal threading on the sleeve 3023 is complementary to the threading on the pusher pin 3010 and leveling pin 3012 so that the pusher pin 3010 and leveling pin 3012 can be screwed through the sleeve. On the other hand, the external threading on the sleeve 3023 is complementary to internal threading in top end plates 3024 and bottom end plates 3026. The end plates 3024, 3026 are then screwed onto the external threading of the sleeve 3023 to lock the pusher pin 3010 and leveling pin 3012 into place along the frame. The pusher pin 3010 and leveling pin 3012 are preferably slidable along the frame when their top end plates 3024 and/or bottom end plates 3026 are loosened.

In another preferred embodiment, the bottom end plates 3026 of the pusher pin 3010 and leveling pin 3012 is integrally formed with their respective sleeve 3023 so that the pusher pin 3010 and leveling pin 3012 can be locked into place by merely tightening their top end plates 3024 to engage the frame 3000.

In an alternate embodiment, the enlarged bearing surfaces 3020, 3022 are removed from the pusher pin 3010 and leveling pin 3012, so that those pins can be completely removed from the frame when the bottom end plates 3026 are removed.

The end plates of the presently preferred embodiments (described above) can be rectangular, square, or circular in shape.

While the present invention has been disclosed in connection with the presently preferred embodiments described herein, it should be understood that there may be other embodiments which fall within this spirit and scope of the invention as defined by the claims. Accordingly, no limitations are to be implied or inferred in this invention except as specifically and as explicitly set forth in the claims.

INDUSTRIAL APPLICABILITY

This invention can be used whenever it is necessary to separate any pipes bonded together by pipe flanges using a transverse force.

What is claimed is:

1. A device to separate a first pipe having a first pipe flange and a second pipe having a second pipe flange, wherein said first pipe flange and said second pipe flange are bonded at a flange joint comprising:

an elongated frame having a front end and a back end;

a frame retaining plate connected to said front end, whereby said frame retaining plate is placed adjacent to said first pipe flange so that said frame extends over said flange joint, and whereby said frame retaining plate prevents longitudal slippage of said device;

a pusher pin having a pusher pin top end and a pusher pin bottom end, located a first distance along said frame from said frame retaining plate, wherein said pusher pin is capable of moving transversely between a first retracted position and a first extended position;

a leveling pin having a leveling pin top end and a leveling pin bottom end, located at said back end, wherein said leveling pin is capable of moving transversely between a second retracted position and a second extended position, and whereby when said leveling pin is pushed to said second extended position, said device is stabilized against said second pipe;

an anchoring pin having an anchoring pin top end and an anchoring pin bottom end, located between said pusher pin and said leveling pin along said frame, wherein said anchoring pin bottom end contains a member which extends toward said flange joint and is configured to anchor said anchoring pin to said second pipe flange; and whereby when said anchoring pin is anchored to said second pipe flange, and said pusher pin is pushed to said first extended position to apply a transverse force on said first pipe flange, said first pipe flange and said second pipe flange slide in opposite directions from each other and are separated.

2. A device according to claim 1, wherein said frame comprises two substantially parallel bars with a space between them.

3. A device according to claim 1, wherein said frame retaining plate contains anti-slip screws to secure said frame retaining plate against said first pipe flange.

4. A device according to claim 1, wherein said pusher pin bottom end and said leveling pin bottom end have enlarged bearing surfaces.

5. A device to separate a first pipe having a first pipe flange and a second pipe having a second pipe flange, wherein said first pipe flange and said second pipe flange are bonded at a flange joint comprising:

an elongated frame having a front end and a back end, wherein said frame comprises two substantially parallel bars with a space between them;

a frame retaining plate connected to said front end, whereby said frame retaining plate is placed adjacent to said first pipe flange so that said frame extends over said flange joint, and whereby said frame retaining plate prevents longitudal slippage of said device;

a pusher pin having a pusher pin top end and a pusher pin bottom end, located a first distance along said frame from said pin retaining plate, which is receivable in a removable, slidable first sleeve having a top side and bottom side, wherein said pusher pin is transversely moveable between a first retracted position and a first extended position through said first sleeve, and wherein said first sleeve is locked into place along said frame by screwing pusher pin end plates onto said first sleeve top side and said first sleeve bottom side until said pusher pin end plates are tightened against said frame;

a leveling pin having a leveling pin top end and a leveling pin bottom end, located at said back end of said frame, wherein said leveling pin is receivable in a removable, slidable second sleeve having a top side and bottom side and transversely movable between a second retracted position and a second extended position through said second sleeve, and wherein said second sleeve is locked into place along said frame by screwing leveling pin end plates onto said second sleeve top side and said second sleeve bottom side until said leveling pin end plates are tightened against said frame, and whereby when said leveling pin is pushed to said second extended position, said device is stabilized against said second pipe;

an anchoring pin, located between said pusher pin and said leveling pin along said frame, wherein said anchoring pin contains an anchoring pin top end and an anchoring pin bottom end with a member extending from said anchoring pin bottom end toward said flange joint to anchor said anchoring pin to said second pipe flange; and whereby when said anchoring pin is anchored to said second pipe flange, and said pusher pin is pushed to said first extended position to apply a transverse force on said first pipe flange, said first pipe flange and said second pipe flange slide in opposite directions from each other and are separated.

6. A device according to claim 5, wherein said pusher pin end plate and said first sleeve bottom side are integrally formed, and said leveling pin end plate and said second sleeve bottom side, are integrally formed.

7. A device according to claim 5, wherein said pusher pin bottom end and said leveling pin bottom end have enlarged bearing surfaces.

8. A device according to any one of claims 5 to 7, wherein said frame retaining plate contains anti-slip screws to secure said frame retaining plate against said first pipe flange.

9. A device to separate a first pipe having a first pipe flange and a second pipe having a second pipe flange, wherein said first pipe flange and said second pipe flange are bonded at a flange joint, comprising:

an elongated frame with a front end and a back end; a pusher pin having a pusher pin top end and a pusher pin bottom end, located a first distance along said frame from said front end, wherein said pusher pin is capable of moving transversely between a first retracted position and a first extended position; a leveling pin having a leveling pin top end and a leveling pin bottom end, located at said back end of said frame, wherein said leveling pin is capable of moving transversely between a second retracted position and a second extended position, and whereby when said leveling pin is pushed to said second extended position, said device is stabilized against said second pipe; an anchoring pin having an anchoring pin top end and an anchoring pin bottom end, located between said pusher pin and said leveling pin along said frame, wherein said anchoring pin bottom end contains a member which extends toward said flange joint and is configured to anchor said anchoring pin to said second pipe flange; and whereby when said anchoring pin is anchored to said second pipe flange, and said pusher pin is pushed to said first extended position to apply a transverse force on said first pipe flange, said first pipe flange and said second pipe flange slide in opposite directions from each other, the improvement comprising:

a frame retaining plate connected to said front end, whereby said frame retaining plate is placed adjacent to said first pipe flange so that said frame extends over said flange joint to prevent longitudinal slippage of said device.

* * * * *